United States Patent [19]

Yamada

[11] Patent Number: 4,534,059
[45] Date of Patent: Aug. 6, 1985

[54] METHOD FOR CORRECTING GRADATION OF OUTPUT DATA, FOR USE IN A PICTURE DIGITAL PROCESSING SYSTEM

[75] Inventor: Mitsuhiko Yamada, Kyoto, Japan

[73] Assignee: Dainippon Screen Seizo Kabushiki Kaisha, Kyoto, Japan

[21] Appl. No.: 429,296

[22] Filed: Sep. 30, 1982

[30] Foreign Application Priority Data

Oct. 13, 1981 [JP] Japan .................................. 56-162016

[51] Int. Cl.³ .............................................. G06K 9/36
[52] U.S. Cl. ....................................... 382/54; 358/80;
358/284; 364/571; 364/737; 371/30
[58] Field of Search ..................... 382/52, 54; 364/571,
364/737, 768, 784; 358/284, 29, 80; 371/30, 31, 57

[56] References Cited

U.S. PATENT DOCUMENTS

| | | | |
|---|---|---|---|
| 3,807,860 | 4/1974 | Brainard | 364/571 |
| 4,032,765 | 6/1977 | Epstein et al. | 371/30 |
| 4,084,239 | 4/1978 | Anastasia et al. | 364/571 |
| 4,356,731 | 11/1982 | Mahony | 364/571 |
| 4,402,015 | 8/1983 | Yamada | 358/80 |
| 4,468,692 | 8/1984 | Yamada et al. | 358/80 |

*Primary Examiner*—Leo H. Boudreau
*Assistant Examiner*—Joseph Mancuso
*Attorney, Agent, or Firm*—Yuter, Rosen & Dainow

[57] ABSTRACT

A method for correcting gradation of output data for reproducing a picture image, for use in a picture digital processing system wherein picture data is processed by using one or a plurality of lookup table memories aligned in series, wherein a variable number of lower bits of input data to be input to the lookup table memory, the number of the lower bits of the input data being varied depending on the input data and the input-output characteristics of the one lookup table memory or the total input-output characteristics of the plurality of lookup table memories, is added as correction data to data output by the one or the plurality of lookup table memories.

9 Claims, 13 Drawing Figures

(a)

(b)

METHOD FOR CORRECTING GRADATION OF OUTPUT DATA, FOR USE IN A PICTURE DIGITAL PROCESSING SYSTEM

BACKGROUND OF THE INVENTION

The present invention relates to a method for correcting gradation of output data for reproducing a picture image so as to compensate for the drop in resolving power of gradation of the output data, or the smoothness of gradation of the reproduction picture, for use in a picture digital processing system wherein picture data is processed by using one or a plurality of lookup table memories aligned in series.

In conventional picture digital processing using lookup table memories aligned in series, especially including at least one lookup table memory having non-linear input-output characteristics, the resolving power of the gradation of output data deteriorates, with a result that gradation of the reproduced picture deteriorates.

There are shown in FIGS. 1 and 2 input-output characteristics curves A and B of conventional lookup table memories which are aligned in series and are used for a conventional picture digital processing system.

There are shown in FIGS. 3 and 4 parts of the input-output characteristics curves A and B of FIGS. 1 and 2, which are enlarged to one least significant bit (LSB) unit scale.

First, when input data $X_0, X_1, X_2, \ldots$ are input to the lookup table memory of FIG. 3 at $t_0, t_1, t_2, \ldots$, as shown in FIG. 5, the table outputs data $Y_0, Y_1, Y_2, \ldots$, consecutively. Then, when the output data $Y_0, Y_1, Y_2, \ldots$ are input to the lookup table memory of FIG. 4, it outputs data $Z_1, Z_4, Z_7, \ldots$, finally. However, as shown in FIG. 6, the resultant output data possess far lower resolving power than the original input data.

SUMMARY OF THE INVENTION

It is an object of the present invention to provide a method for correcting gradation of output data for reproducing a picture image, for use in a picture digital processing system wherein picture data is processed by using one or a plurality of lookup table memories aligned in series, free from the aforementioned defects and inconveniences. The invention can compensate for the drop in resolving power of gradation of the output data of the lookup table memories, and is capable of obtaining a reproduction picture having a fine and smooth gradation.

According to the present invention there is provided a method for correcting gradation of output data for reproducing a picture image, for use in a picture digital processing system wherein picture data is processed by using one or a plurality of lookup table memories aligned in series, the improvement which comprises the step of adding a variable number of lower bits of input data to be input to the lookup table memory, as correction data, the lower bit number of the input data being varied depending on the input data and the input-output characteristics of the one lookup table memory, or the total input-output characteristics of the plurality of lookup table memories, to output data from the one or the plurality of lookup table memories.

BRIEF DESCRIPTION OF THE DRAWINGS

In order that the present invention may be better understood, preferred embodiments thereof will be described with reference to the accompanying drawings, in which.

DESCRIPTION OF THE PREFERRED EMBODIMENTS

Figure 1:
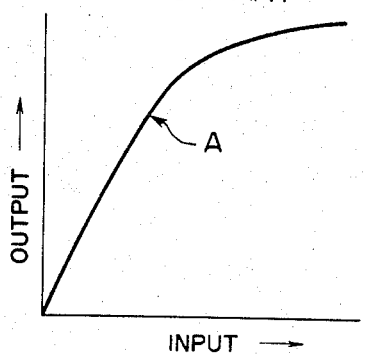
FIGS. 1 and 2 are graphs showing input-output characteristics curves of conventional lookup table memories.
Figure 2:
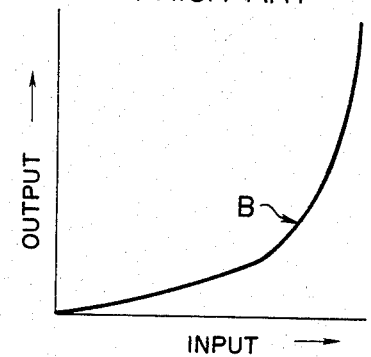
Figure 3:
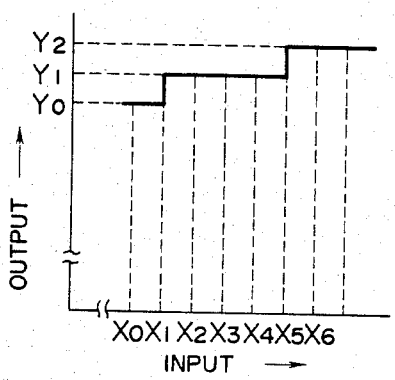
FIGS. 3 and 4 show parts of the input-output characteristics curves of FIGS. 1 and 2, which are enlarged.
Figure 4:
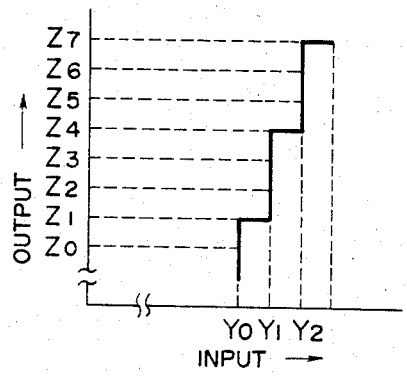
Figure 5:
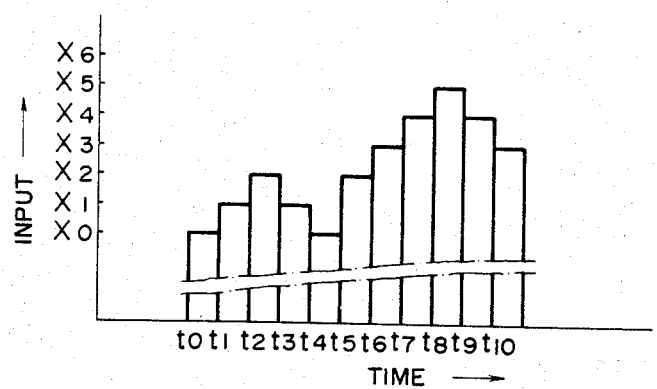
FIG. 5 shows one embodiment of input data with reference to time, which is input to the lookup table memories of FIGS. 1 and 2.
Figure 6:
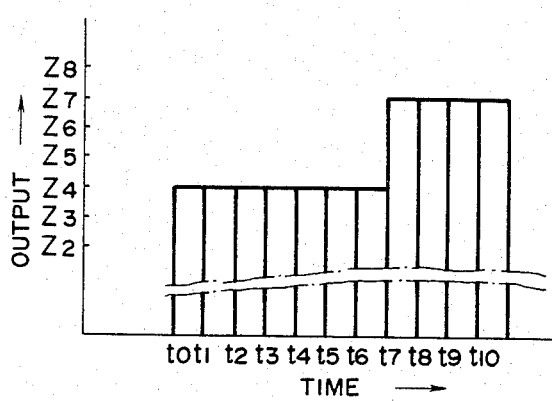
FIG. 6 shows one embodiment of output data with reference to time, which is obtained finally in a conventional manner.
Figure 7:
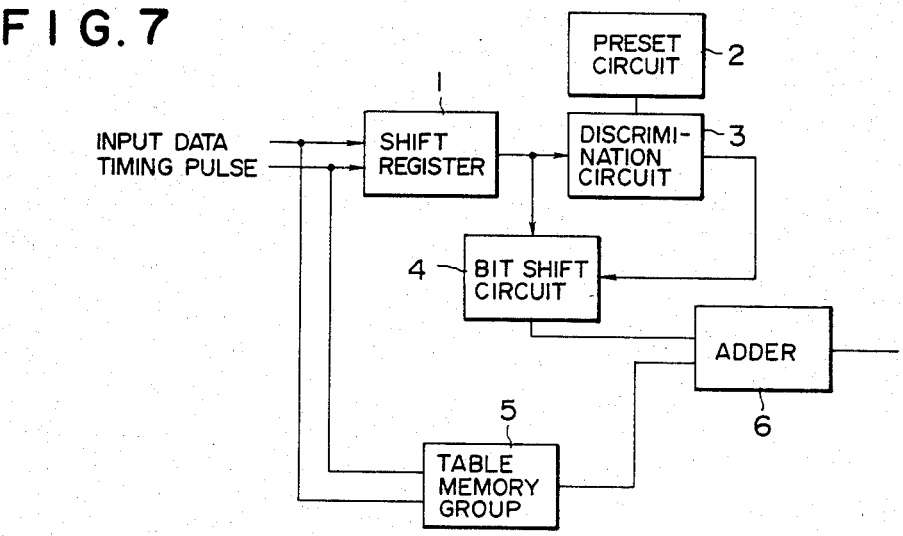
FIG. 7 is a block diagram of one embodiment of a circuit which performs a method according to the present invention.
Figure 8:
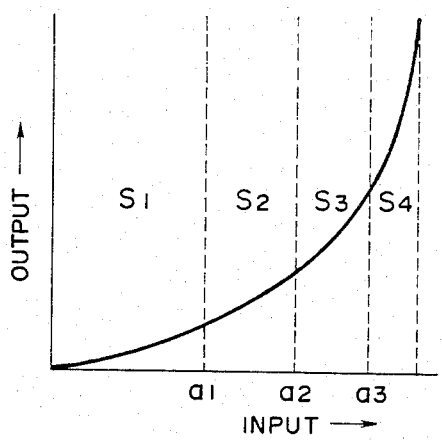
FIG. 8 is a graph showing a total input-output characteristics curve of a lookup table memory group shown in FIG. 7.

Referring to the drawings there is shown in FIG. 7 one embodiment of a circuit which performs the method according to the present invention, comprising a shift register 1, a preset circuit 2, setting in advance values $a_1$, $a_2$ and $a_3$ for dividing input data into a plurality of areas $S_1$, $S_2$, $S_3$ and $S_4$, as shown in FIG. 8, a discrimination circuit 3 which compares the input data sent from the shift register 1 with the preset values of the preset circuit 2 and determines which area $S_1$, $S_2$, $S_3$ or $S_4$ the input data is included in, a bit shift circuit 4 which selects a correction signal having a proper bit number depending on the discrimination signal output by the discrimination circuit 3, a lookup table memory group 5, and an adder 6.

The reason why such a determination is required will be clear by considering one example where the resolving power of gradation is corrected by adding equally the lower three bits of the input data as correction data to the output data, output from the lookup table memory group 5, as follows.

When the input data is included in the area S1 where the variation of the output data with reference to the input data is approximately one bit, the correction data is added beyond the moving range of the main data, resulting in an excessive correction. On the other hand, when the input data is included in the area S4, where the variation of the output data with reference to the input data is very large, the correction data, that is, the lowest three bits is not enough, resulting in insufficient correction.

In accordance with the present invention, in order to overcome such disadvantages as excessive or insufficient correction, it is determined in the discrimination circuit 3 where the input data is included, that is, in which one of the table input-output characteristics areas of the lookup table memory group. Then the discrimination circuit 3 outputs a discrimination signal accordingly. Depending on the discrimination signal, correction data is added or subtracted to or from the data output from the lookup table memory, the correction data affecting a suitable number of least significant or lower bits of the output data, thereby compensating an excessive or insufficient correction.

Now, when input data of eight bits is first latched in the shift register 1 and then is output from it at a proper timing by a pulse signal generated by a timing pulse generator (not shown), the input data is compared in the discrimination circuit 3 with values preset in the preset circuit 2. Then, depending on the magnitudes of the comparison result, it is determined in which areas, obtained by dividing the input axes of the total input-output characteristics of the lookup table memory group 5 into a plurality of parts, the input data is included.

Figure 9:
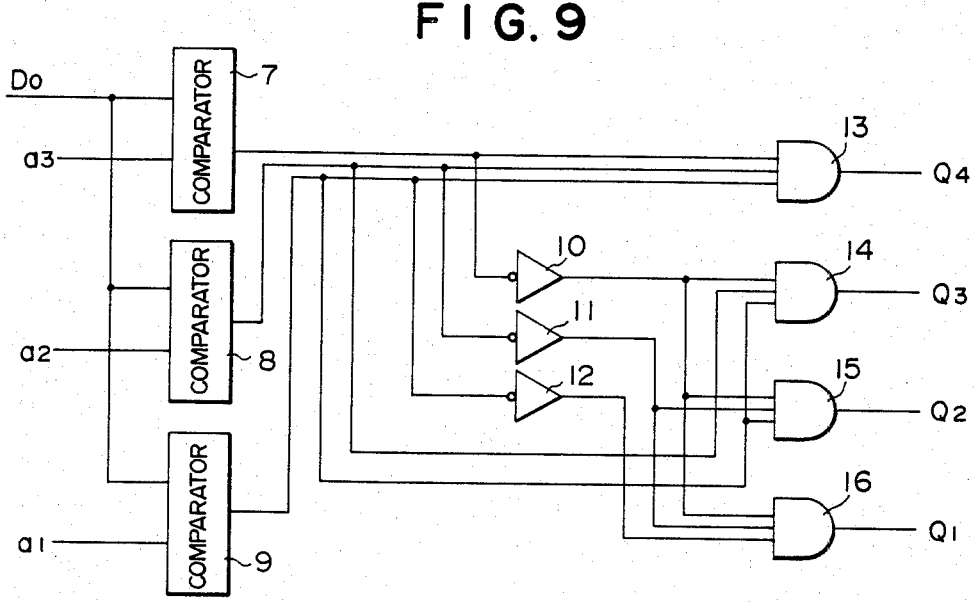
FIG. 9 shows one embodiment of a discrimination circuit of FIG. 7.

As shown in FIG. 9, the discrimination circuit 3 comprises comparators 7, 8 and 9, inverters 10, 11 and 12 and AND gates 13, 14, 15 and 16.

However, when the total input-output characteristics of the lookup table memory group 5 are expressed by a curve shown in FIG. 8, in the discrimination circuit 3 shown in FIG. 9, input data $D_0$ is compared with the preset values $a_1$, $a_2$ and $a_3$ in the comparators 7, 8 and 9, respectively wherein $0 < a_1 < a_2 < a_3$. Then depending on the magnitudes between the input data $D_0$ and the preset values $a_1$, $a_2$ and $a_3$, one of the AND gates 13, 14, 15 and 16 outputs a discrimination signal of high level.

That is, when the input data $D_0$ satisfies the condition: $D_0 < a_1$, the comparators 7, 8 and 9 output low level signals, and thus the AND gate 16 outputs the discrimination signal. In the same manner as described above, when $a_1 \leq D_0 < a_2$, the AND gate 15 outputs a high signal; when $a_2 \leq D_0 < a_3$, the AND gate 14 outputs a high signal; and when $a_3 \leq D_0$, the AND gate 13 outputs a high signal. The discrimination signal is fed to the bit shift circuit 4.

Figure 10:
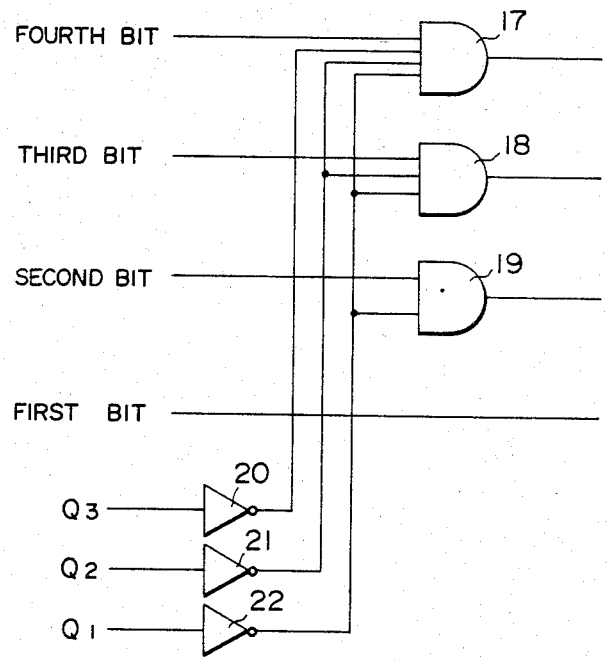
FIG. 10 shows one embodiment of a bit shift circuit of FIG. 7.

One embodiment of the bit shift circuit 4 is shown in FIG. 10, and comprises AND gates 17, 18 and 19, and inverters 20, 21 and 22. The fourth bit, the third bit and the second bit of the lower four bits of the input data of eight bits, which is output from the shift register 1 with proper timing, are connected to one input terminal of the AND gates 17, 18 and 19, respectively.

Now, when $D_0 \geq a_3$, the AND gate 13 outputs a discrimination signal of high level and thus low level signals are fed to input terminals $Q_1$, $Q_2$ and $Q_3$ of the inverters 20, 21 and 22 from the AND gates 14, 15 and 16 of the discrimination circuit 3, as shown in FIG. 10. Then the inverters 20, 21 and 22 invert the low level signals and output high level signals to the respective AND gates 17, 18 and 19. Hence, the bit shift circuit 4 outputs correction data corresponding to the lower four bits of the input data $D_0$.

When $a_2 \leq D_0 < a_3$, the AND gate 14 outputs a discrimination signal of high level to the terminal $Q_3$, and hence low level signals are input to the other terminals $Q_1$, $Q_2$ and $Q_4$. Accordingly, the bit shift circuit 4 outputs correction data corresponding to the lower three bits of the input data $D_0$. When $a_1 \leq D_0 < a_2$, the bit shift circuit 4 outputs correction data corresponding to the lower two bits of the input data $D_0$ in the same manner as described above.

Further, when $D_0 < a_1$, the AND gate 16 outputs a discrimination signal of high level, and the bit shift circuit 4 outputs correction data corresponding to the lowermost one bit of the input data $D_0$. In this case, the correction data is not so significant, and therefore it may be processed so that no correction data is output from the bit shift circuit 4, or that correction data corresponding to the lower two bits of the input data $D_0$ is output from the bit shift circuit 4.

It is readily understood from the above description that the bit shift circuit 4 controls the value of the correction data, i.e. the number of the lower bits of the input data to be added to the output data, output from the lookup table memory group 5, depending on the total input-output characteristics of the lookup table memory group 5 and the input data corresponding to the output data.

The correction data output from the bit shift circuit 4 is then sent to the adder 6 and is added to the output data output from the lookup table memory group 5, thereby compensating or recovering the decrease of resolving power of the gradation of the output data, which is caused in the lookup table memory group 5.

Figure 11:
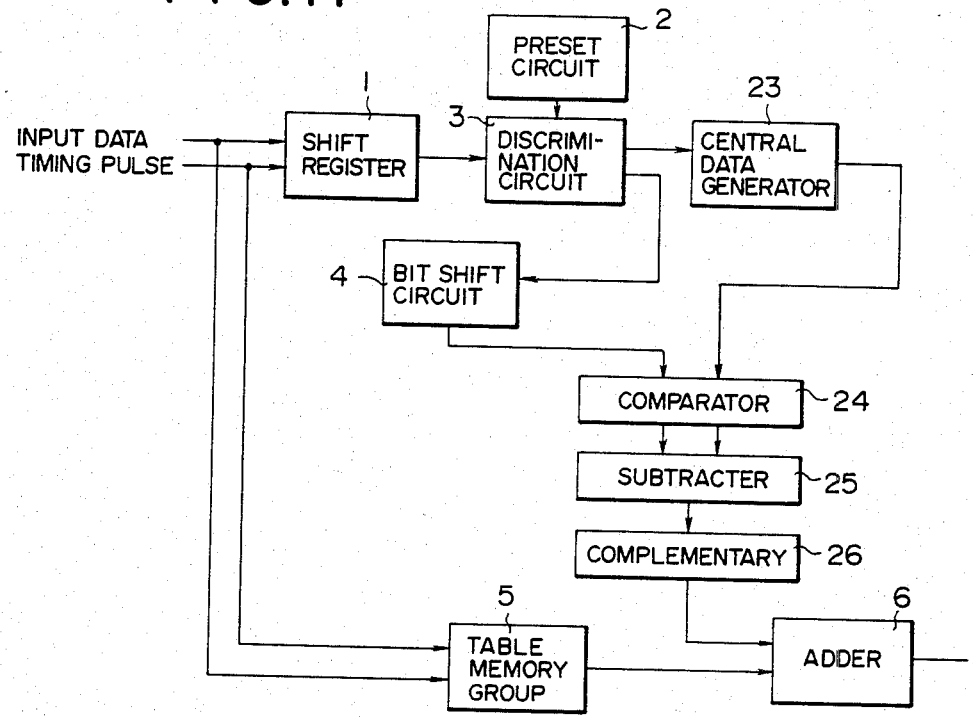
FIG. 11 is a block diagram of another embodiment of a circuit which performs a method according to the present invention.

In FIG. 11 there is shown another embodiment of a circuit which performs a method according to the present invention, having basically the same construction as that shown in FIG. 7, except further comprising a central data generator 23, a comparator 24, a subtracter 25 and a complementary circuit 26, as hereinafter described in detail.

In the first embodiment described above the correction data output on the bit shift circuit 4 is directly added to the corresponding output data of the lookup table memory group 5, thereby compensating the decrease in resolving power of gradation of the output data, which loss of resolving power occurs in the lookup table memory group 5. However, in the second embodiment shown in FIG. 11, gradation corrections performed in the following manner.

In this embodiment, the correction data to be added to the output data of the lookup table memory group 5 is compared with the central data of a data region expressed by the bit number of the correction data, for example, the central data is 1000 when the bit number of the correction data is four bits. Then depending on the magnification between the two data, the correction data is properly added or subtracted from the output data of the lookup table memory group 5, thereby restoring the loss of resolving power in the gradation of the output data, which is lost in the lookup table memory group 5, as hereinafter described.

In FIG. 11 the numerals 1-6 denote the same elements as those of FIG. 7. The central data generator 23 outputs the central data of the data region expressed by the bit number of the correction data depending on the discrimination signal output from the discrimination circuit 3.

Hence, now, when the bit shift circuit 4 outputs correction data to the comparator 24, the comparator 24 compares the correction data with the central data, and then the substrate 25 performs the subtraction described above depending on the magnitude of the comparison result in the comparator 24.

The output data generated by the subtracter 25 is sent to the adder 6 via the complementary circuit 26 wherein the output data of the subtracter 25 is converted into the complement of "2" only when the central data is larger than the correction data, as described above. The adder 6 adds the data sent from the complementary circuit 26 to the corresponding output data output by the lookup table memory group 5.

Figure 12:
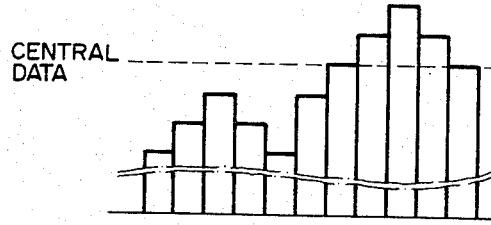
FIGS. 12a and 12b show one embodiment of input data and output data of FIG. 11.
Figure 12:
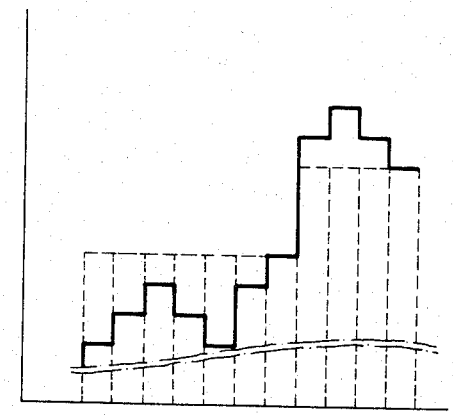

Now, when the bit shift circuit 4 outputs the correction data shown in FIG. 12a, since the correction data which is added to or subtracted from the central data properly, is added to the output data in the adder 6, output data is obtained whose gradation is more similar to that of the input data. The result is different from the method of the first embodiment described above, the result being illustrated in FIG. 12b.

Although the present invention has been described in some details by way of illustration and example for purposes of clarity of understanding, it will, of course, be understood that various changes and modifications may be made in the form, details, and arrangements of the parts without departing from the scope of the present invention.

The method of the present invention can, of course, be applied to a picture digital processing system including only one lookup table memory.

What is claimed is:

1. A method for correcting gradation of output digital data for reproducing a picture image, for use in a picture digital processing system wherein input digital picture data represented by digital bits is processed and corrected by using at least one lookup table memory having input-output characteristics, the improvement comprising the step of adding as correction data a variable number of lower bits to the data output from said lookup table memory after said input data has been input to and corresponding data has been output from said lookup table memory, the quantity of lower bits being varied depending on both the input data itself and the relationship of said input data to said input-output characteristics of said at least one lookup table memory, said lower bits being the least significant bits in said digital data.

2. A method for correcting gradation of output digital data for reproducing a picture image as claimed in claim 1, wherein the number of said lookup table memories is at least two and said lookup memories are aligned in series.

3. A method for correcting gradation of output digital data for reproducing a picture image for use in a picture digital processing system wherein input digital picture data represented by digital bits is input, corrected and output by at least one lookup table memory having input-output characteristics, the improvement comprising the steps:
    dividing said input-output characteristics of said at least one lookup table memory into a plurality of areas;
    determining in which one of said areas the input data is located;
    adding a number of bits as correction data to the data output of said lookup table memory, said number of bits being a variable dependent upon both the area location of said input data within said input-output characteristics, and also the corresponding bit values of the input data, said added bits being applied to the least significant bit positions of said table memory output.

4. A method for correcting gradation of output digital data for reproducing a picture image as claimed in claim 3, wherein said variable number of bits representative of correction data for each said area, respectively, is compared to a central data value for each said area to obtain a difference value expressed in bits, said difference value, and not said correction data of a variable number of bits, being added in the least significant bit positions to said data output from said lookup table memory.

5. A method for correcting gradation of output digital data for reproducing a picture image as claimed in claim 13, wherein the number of said lookup table memories is at least two and said lookup memories are aligned in series.

6. A method of correcting gradation of output digital data for reproducing a picture image as claimed in claim 4, wherein the number of said lookup table memories is at least two and said lookup memories are aligned in series.

7. An apparatus for correcting gradation of output digital data for reproducing a picture image for use in a picture digital processing system, comprising;
    at least one lookup memory table having an input-output characteristic, digital picture data being input to said lookup memory table and outputted with corrections in correspondence with said input-output characteristic;
    means for determining where said picture input data is located within said input-output characteristic;
    means for arithmetically modifying the least significant bits of said output from said at least one lookup memory table, the number modified of said least significant bits being a variable dependent upon both the location of said digital picture input data within said input-output characteristic of said lookup memory table and also upon the corresponding bits in the input digital data.

8. An apparatus for correcting gradation of output digital data for reproducing a picture image for use in a picture digital processing system, as claimed in claim 7, and further comprising means for determining a difference between said variable number of least significant bits to be modified and a predetermined central value of bits, said central value being representative of said location of said incoming picture data within said input-output characteristic, said difference being combined with said output of said lookup memory table to modify the least significant bits of said lookup table output.

9. An apparatus for correcting gradation of output digital data for reproducing a picture image for use in a picture digital processing system, as claimed in claim 7, wherein the number of said lookup memory tables is at least two and said tables are aligned in series.

* * * * *

UNITED STATES PATENT AND TRADEMARK OFFICE
CERTIFICATE OF CORRECTION

PATENT NO. : 4,534,059
DATED : August 1985
INVENTOR(S) : METHOD FOR CORRECTING GRADATION OF OUTPUT DATA, FOR USE IN A PICTURE DIGITAL PROCESSING SYSTEM It is certified that error appears in the above—identified patent and that said Letters Patent are hereby corrected as shown below:

Column 4, line 58, change "substrate" to --subtracter--.

Column 6, line 15, change "claim 13" to --claim 3--.

Signed and Sealed this

Twenty-third Day of September 1986

[SEAL]

Attest:

DONALD J. QUIGG

Attesting Officer   Commissioner of Patents and Trademarks